United States Patent
Zaple et al.

(10) Patent No.: US 6,928,827 B2
(45) Date of Patent: Aug. 16, 2005

(54) CONTROL OF TEMPERATURE OF SUPPLY OF PRESSURIZED AIR

(75) Inventors: Michael John Zaple, Yeovil (GB); Christopher James White, Yeovil (GB)

(73) Assignee: Honeywell Normalair-Garrett (Holdings) Limited (GB)

(*) Notice: Subject to any disclaimer, the term of this patent is extended or adjusted under 35 U.S.C. 154(b) by 0 days.

(21) Appl. No.: 10/716,227

(22) Filed: Nov. 18, 2003

(65) Prior Publication Data

US 2004/0134208 A1 Jul. 15, 2004

(30) Foreign Application Priority Data

Nov. 30, 2002 (GB) .............................................. 0228003

(51) Int. Cl.⁷ .............................. F25B 9/00; F25B 19/02; F25B 1/06
(52) U.S. Cl. ................................ 62/170; 62/500; 62/86
(58) Field of Search .......................... 62/500, 170, 172, 62/402, 87, 86

(56) References Cited

U.S. PATENT DOCUMENTS

| | | | |
|---|---|---|---|
| 2,870,698 A | 1/1959 | Best | 98/1.5 |
| 4,209,993 A * | 7/1980 | Rannenberg | 62/80 |
| 4,312,191 A * | 1/1982 | Biagini | 62/402 |
| 4,840,036 A | 6/1989 | Spraker, Jr. | 62/172 |

* cited by examiner

*Primary Examiner*—Chen Wen Jiang
(74) *Attorney, Agent, or Firm*—MacMillan, Sobanski & Todd, LLC

(57) ABSTRACT

A method of, and apparatus, for, controlling the temperature of pressurized air such as bleed air from a gas turbine engine, wherein the air is passed through a heat exchanger to exchange heat with coolant air which is caused to flow through the heat exchanger by operation of an ejector device powered by some of the pressurized air, the supply of the pressurized air to the ejector device is controlled to control the flow of coolant air and hence control the temperature of the pressurized air downstream of the heat exchanger.

8 Claims, 1 Drawing Sheet

CONTROL OF TEMPERATURE OF SUPPLY OF PRESSURIZED AIR

BACKGROUND OF THE INVENTION

This invention relates to a method of, and apparatus for, controlling the temperature of pressurized air supplied from a source thereof, for use in a system or a device which makes use of it.

The invention has been devised in the context of the supply of bleed air from at least one gas turbine engine of an aircraft. It is known to use bleed air from a gas turbine engine (i.e. air taken from the flow of air through the engine after a compressor stage of the engine and thus pressurized) in ancillary systems of the aircraft such as an air conditioning system for example. A further example where bleed air might be used in an aircraft is a system for oxygen separation using a pressure swing adsorption process, to provide an oxygen or oxygen-enriched supply for breathing by crew or other persons on board the aircraft.

Some systems such as pressure swing adsorption systems for oxygen separation are particularly sensitive to variations in the temperature of pressurized air with which they are supplied, and the temperature must be controlled within relatively narrow limits if the system is to perform satisfactorily. Bleed air as supplied from an aircraft engine(s) is usually at a higher temperature than that required, and consequently needs to be cooled which is usually accomplished by passing the bleed air through a heat exchanger which puts it in heat exchange relationship with a coolant fluid. The cooling effect of a heat exchanger depends on the difference in temperature between the fluid which is being cooled and the coolant fluid, and on the flow rates of the two fluids. Often the coolant is ram air, i.e. ambient air which is caused to pass through the heat exchanger as a result of the aircraft's forward movement and it will be appreciated that in this case the temperature and flow rate of the coolant air can vary substantially: such variations result in variations in the temperature of the bleed air after it has passed through the heat exchanger. If the coolant is ram air, none is provided if the aircraft is not moving.

DESCRIPTION OF THE PRIOR ART

There are known ways to control the temperature of the bleed air as it is delivered from the heat exchanger. For example there is the technique known as "bleed air bypass", in which some of the bleed air is constrained to by-pass the heat exchanger, and is then mixed with the bleed air which has passed through the heat exchanger, downstream of the heat exchanger, under the control of a temperature-responsive valve. Another technique is to modulate the flow of the coolant by operating a suitable valve provided in the path of coolant flow. Either of these techniques introduces inefficiencies by impeding the flow of the bleed air or coolant as the case may be, or by wasting the pressurized air.

BRIEF SUMMARY OF THE INVENTION

According to one aspect of the present invention, we provide a method of controlling the temperature of pressurized air supplied from a source thereof, including the steps of passing the pressurized air through a heat exchanger wherein it is in heat-exchange relationship with coolant air, flow of the coolant air through the heat exchanger being caused to take place by an ejector device using some of the pressurized air, the method including controlling the supply of the pressurized air to the ejector device in accordance with the temperature of the pressurized air downstream of the heat exchanger.

In a method in accordance with the invention, the flow of coolant air is controlled by controlling the supply of pressurized air to the ejector device. Only as much of the supply of the pressurized air is used to power the ejector device as is necessary in view of the temperature of the pressurized air downstream of the heat exchanger. Waste of the pressurized bleed air is reduced.

The temperature of the pressurized air downstream of the heat exchanger may be sensed, and compared by a control means, with a desired temperature, the control means providing a control signal, e.g. to vary the setting of a valve, to cause an increase or decrease the flow of pressurized air to the ejector, when the temperature of the pressurized air deviates from the desired value.

The method may include directing the pressurized air from the heat exchanger to a downstream system being at least one of an air conditioning system for providing conditioned air, and a system for providing a supply of breathable air, for example, in an aircraft.

According to a second aspect of the invention, we provide apparatus for controlling the temperature of pressurized air supplied from a source thereof, including a heat exchanger through which the pressurized air is passed and brought into heat exchange relationship with coolant air, an ejector device supplied with some of the pressurized air and operable to induce flow of the coolant air through the heat exchanger, a temperature sensor for sensing the temperature of the pressurized air downstream of the heat exchanger, and a controller operable to control the supply of the pressurized air to the ejector device in accordance with the sensed temperature of the pressurized air downstream of the heat exchanger.

To control the supply of pressurized air to the ejector device, the apparatus may utilize a modulating valve of any suitable type disposed in a conduit leading the bleed air to the ejector device, responsive to the controller.

According to a third aspect of the invention we provide an aircraft including the apparatus of the second aspect of the invention.

BRIEF DESCRIPTION OF THE DRAWINGS

Embodiments of the invention will now be described with reference to the accompanying drawings including.

DETAILED DESCRIPTION OF THE INVENTION

Figure 1:
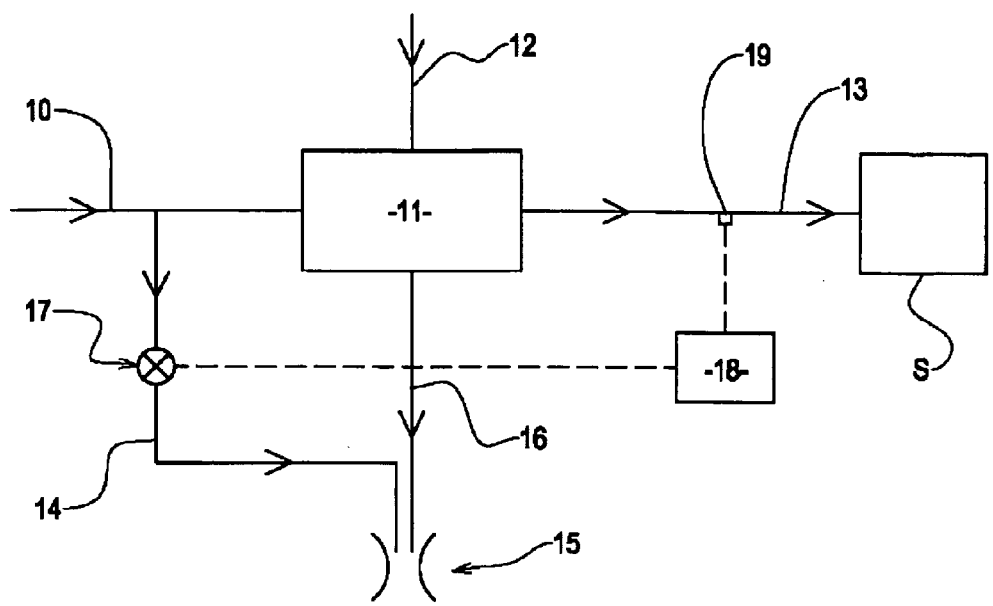
FIG. 1 is an illustrative view of an apparatus which may be operated by a method according to the invention.
Figure 2:
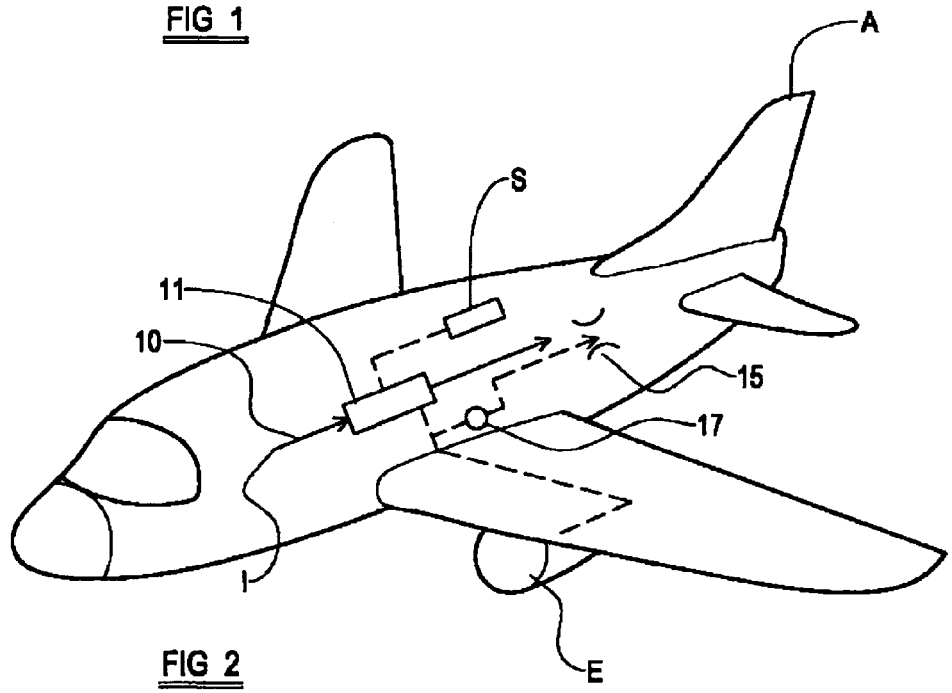
FIG. 2 is an illustrative view of an aircraft having an apparatus as illustrated in FIG. 1.

Referring to the drawings, pressurized bleed air is supplied along a supply conduit 10 from a gas turbine engine or engines E of an aircraft A, the engine(s) E being either a main engine(s) as illustrated in FIG. 2, or that of an auxiliary power unit. The bleed air supply is pressure/flow regulated upstream of the supply conduit 10, so the supply is stable in respect of its pressure. Having been compressed, the bleed air will be hot and for use in, a downstream system S such as for examples, an oxygen separation system of the pressure swing adsorption type or an air conditioning system, is required to be cooled and supplied at a temperature controlled within relatively close limits. To this end the bleed air is passed through a heat exchanger 11, which may be of cross-flow or counter-flow type, in which it is brought into heat exchange relationship with a coolant flow of air reaching the heat exchanger 11 along conduit 12 from an inlet I of the aircraft A. Downstream of the heat exchanger 11, the pressurized bleed air is delivered by a delivery conduit 13 to the systems or device where it is to be used.

From the supply conduit 10, some of the pressurized bleed air is able to be delivered by way of a branch conduit 14 to an ejector device 15 in which flow of the partial quantity of the pressurized bleed air is used to induce a flow of the ambient pressure coolant air through the heat exchanger 11, a duct 16 for the coolant air leading from the heat exchanger 11 to the ejector device 15.

Ejector devices, in which flow of a first fluid such as the pressurized bleed air, in a suitably shaped passage or nozzle is used directly to induce flow of a second fluid, such as the coolant air, without any intervening mechanical parts, are well known and will not therefore be described in detail. The flow rate of the second fluid varies dependant on the flow rate of the first fluid supplied to the ejector device 15.

In the branch conduit 14 there is provided a valve 17, which is a modulating valve of any suitable type, e.g. rotary or linear, and whose operation is controlled, e.g. electrically or pneumatically, from a controller 18. A temperature sensor is indicated at 19 for sensing the temperature of the bleed air in the delivery conduit 13 downstream of the heat exchanger 11, and the sensor 19 produces an output signal which is supplied to the controller 18. The controller 18 compares the sensed temperature with a desired temperature for the air in the delivery conduit 13, and provides a signal to the valve 17 to increase or decrease the flow of bleed air supplied to the ejector 15, and hence the flow of coolant air through the heat exchanger 11, in accordance with the temperature comparison. Hence the temperature of the air in the delivery conduit 13 can be kept as close as possible to the desired value.

Various modifications may be made without departing from the scope of the invention.

For example, instead of the controller 18 issuing an electrical control signal to the modulating valve 17, the controller 18 may, where the valve 17 is pneumatically or hydraulically actuated, issue a pneumatic or hydraulic control signal, as appropriate.

The invention may be utilized otherwise than in an aircraft E, in respect of supplying pressurized air to an alternative downstream system S to that described.

What is claimed is:

1. A method of controlling the temperature of pressurized air supplied from a source thereof, including the steps of passing the pressurized air through a heat exchanger wherein it is in heat-exchange relationship with coolant air, wherein a flow of the coolant air through the heat exchanger is caused to take place by an ejector device using some of the pressurized air, the method including controlling the supply of the pressurized air to the ejector device in accordance with the temperature of the pressurized air downstream of the heat exchanger.

2. A method according to claim 1 including sensing the temperature of the pressurized air downstream of the heat exchanger, comparing such sensed temperature with a desired temperature, and providing a control signal to cause the supply of the pressurized air to the ejector device to be varied when the sensed temperature deviates from the desired value.

3. A method according to claim 1 wherein the method includes directing the pressurized air from the heat exchanger to a downstream system which is at least one of an air conditioning system for providing conditioned air, and a system for providing a supply of breathable air.

4. A method according to claim 3 which is performed in an aircraft.

5. Apparatus for controlling the temperature of pressurized air supplied from a source thereof, including a heat exchanger through which the pressurized air is passed and brought into heat exchange relationship with coolant air, an ejector device supplied with some of the pressurized air and operable to induce a flow of the coolant air through the heat exchanger, a temperature sensor for sensing the temperature of the pressurized air downstream of the heat exchanger, and a controller operable to control the supply of the pressurized air to the ejector device in accordance with the sensed temperature of the pressurized air downstream of the heat exchanger.

6. Apparatus according to claim 5 wherein the controller is operable to compare the sensed temperature of the pressurized air downstream of the heat exchanger with a desired temperature, and to provide a control signal to control the supply of pressurized air to the ejector device in accordance with deviation of the temperature of the pressurized air from a desired value.

7. Apparatus according to claim 5 including a modulating valve responsive to the control signal disposed in a conduit supplying the pressurized air to the ejector device.

8. An aircraft having apparatus for controlling the temperature of pressurized air supplied from a source thereof, including a heat exchanger through which the pressurized air is passed and brought into heat exchange relationship with coolant air, an ejector device supplied with some of the pressurized air and operable to induce flow of the coolant air through the heat exchanger, a temperature sensor for sensing the temperature of the pressurized air downstream of the heat exchanger, and a controller operable to control the supply of the pressurized air to the ejector device in accordance with the sensed temperature of the pressurized air downstream of the heat exchanger.

* * * * *